(12) United States Patent
Toh

(10) Patent No.: US 6,346,966 B1
(45) Date of Patent: *Feb. 12, 2002

(54) IMAGE ACQUISITION SYSTEM FOR MACHINE VISION APPLICATIONS

(75) Inventor: Peng Seng Toh, Singapore (SG)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,076

(22) Filed: Jul. 7, 1997

(51) Int. Cl.[7] ............................................... H04N 5/225
(52) U.S. Cl. ........................... 348/79; 348/340; 348/342
(58) Field of Search ............................... 348/79, 91, 92, 348/164, 162, 342, 340, 262; 356/73, 239.8, 237.3, 237.2, 239.7, 239.1; 250/458.1; 382/145, 147, 148, 191; 359/368, 385, 388, 389

(56) References Cited

U.S. PATENT DOCUMENTS

| | | | | |
|---|---|---|---|---|
| 4,538,909 A | * | 9/1985 | Bible et al. ................. | 356/237 |
| 4,900,934 A | * | 2/1990 | Peeters et al. ............ | 250/461.2 |
| 5,332,905 A | * | 7/1994 | Brooker et al. ........... | 250/458.1 |
| 5,371,624 A | * | 12/1994 | Nagano et al. ............. | 359/389 |
| 5,386,112 A | * | 1/1995 | Dixon ......................... | 359/368 |
| 5,515,169 A | * | 5/1996 | Cargill et al. ............... | 356/417 |
| 5,555,474 A | * | 9/1996 | Ledger ........................ | 356/381 |
| 5,591,981 A | * | 1/1997 | Heffelfinger et al. ..... | 250/458.1 |
| 5,760,827 A | * | 6/1998 | Faris ........................... | 348/42 |
| 5,822,053 A | * | 10/1998 | Thrailkill ................. | 356/237.1 |

FOREIGN PATENT DOCUMENTS

EP          0685732 A1       5/1989

* cited by examiner

Primary Examiner—Wendy R. Garber
Assistant Examiner—Mitchell White

(57) ABSTRACT

An image acquisition system is provided that allows different lighting techniques to be applied to a scene containing an object of interest concurrently. Within a single position, multiple images which are illuminated by different lighting techniques can be acquired by selecting specific wavelength bands for acquiring each of the images. In a typical application, both back lighting and front lighting can be simultaneously used to illuminate an object, and different image analysis methods may be applied to the images.

8 Claims, 5 Drawing Sheets

IMAGE ACQUISITION SYSTEM FOR MACHINE VISION APPLICATIONS

BACKGROUND OF THE INVENTION

The present invention generally relates to a method of image acquisition and lighting techniques for machine vision applications. More specifically, the invention relates to an image acquisition system and method for acquiring multiple images of an object.

Lighting is crucial to the success of machine vision application. A large number of lighting or illumination methods exist that are applicable to machine vision. Some of the commonly used lighting methods can be classified into three categories: back lighting, front lighting, and structured and filtered lighting.

Back lighting is light that comes from the opposite side of the object from which the video source views. Back light which is bright produces a silhouette of an opaque object. The surface of the object is not lit up. For the case of transparent objects, such as plastics and glass, back light is capable of revealing inclusions and scratches. Back lighting provides the highest contrast resulting in a binary image.

Front lighting is lighting that comes from the same side of the object from which the video source views. Front lighting is capable of revealing surface features with different shades of gray or color. Front lighting can be further divided into various configurations, such as directional front light, uniform front light, or onaxis or episcopic front light.

Structured and filtered lighting is a mode of lighting that is usually applied in the front lighting way with filters or patterned gratings attached to the light path. For example, a single or multiple sheet of light can be generated and be projected onto the object surface. One application of such a lighting method is to compute the surface height of the object. This is known as shape from structured light in the art of computer vision. Structured light can also be generated from a laser source with appropriate optics. On the other hand, a polarizer and/or color filters can be used to generate polarized and narrow waveband light.

Most of the time, multiple lighting arrangements are required in an application. For example, back lighting as well as front lighting may be required in a single application. The role of the back light is to highlight the silhouette or contour of the object whereas front light can reveal the surface reflectance and conditions of the object. These two types of lighting cannot exist together as they will cancel the effect of one another. Due to the fact that multiple lighting arrangements cannot be simultaneously applied to the scene, each of the lighting arrangements has to be applied sequentially. Such a sequential mode of lighting application may not be feasible due to time constraints and also due to resultant increasing system complexity and cost.

Known attempts have resorted to multiple stations with separate lighting, cameras and optics when multiple lighting techniques are required to inspect the same object. This arrangement is costly in initial set-up as well as maintenance. Switching of light sources has also been attempted. For example, in the case of both back lighting and front lighting, the first image can be taken with the back light source on while the front light source is off. The second image is taken with the front light on and the back light off. This method requires additional dimension of control for the light sources and may incur reliability problems as lights are being turned on and off rapidly.

A need, therefore, exists for an improved image acquisition system and method for machine visions applications.

SUMMARY OF THE INVENTION

It is, therefore, an object of the present invention to ameliorate this problem and to provide an image acquisition system which, in a preferred form, is able to acquire a plurality of images of an object simultaneously with each image relating to a different lighting technique. A further object of the present invention is to provide a method for acquiring such images.

In an embodiment, the present invention provides an image acquisition system having viewing means, separating means operable to separate light incoming from the viewing means into a plurality of light paths, and an image sensor located in each of the light paths. The system is configured such that each of the image sensors is operable to acquire an image from a predetermined wavelength band of the light in its respective light path.

In another embodiment, the present invention provides a method of acquiring a plurality of images of an object. The method comprises the steps of: lighting the object using a plurality of light sources each being limited to a predetermined wavelength band; viewing the object through viewing means; separating the incoming light from the viewing means into a plurality of light paths; and acquiring an image of the object from a predetermined wavelength band of the light in each of the light paths.

In a preferred embodiment of the present invention, different lighting methods are differentiated by light sources of different bands of wavelength. These different bands of wavelength produced by the light sources have minimum or no overlap. These different lighting techniques are applied simultaneously to illuminate the object.

It is further provided that the image acquisition system viewing the object is capable of separating the different bands of wavelength of light either transmitted or reflected from the object into different paths with different image sensors. The system is arranged such that each of the image sensors captures the image of the object illuminated by different lighting techniques. Different image analysis techniques are then applied to the images acquired by the image sensors on the different image paths. A preferred form of the invention hence provides a means to view the object illuminated by multiple lighting techniques from a single position.

In an embodiment, the image acquisition system includes an objective lens as the viewing means and a beam splitter that splits the incoming light into multiple paths. The objective lens provides a common aperture and field of view for the multiple image paths. Each of the multiple paths are wavelength limited preferably by filters and have minimum overlap response with respect to one another. Image sensors are used to capture the images from each of the image paths. It is further provided that optional filters, such as a neutral density filter, can be inserted in the different image paths to control the intensity. A frame grabber may be used to digitize the images captured by the image sensors and send them to the processor for image processing and analysis.

These and other advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
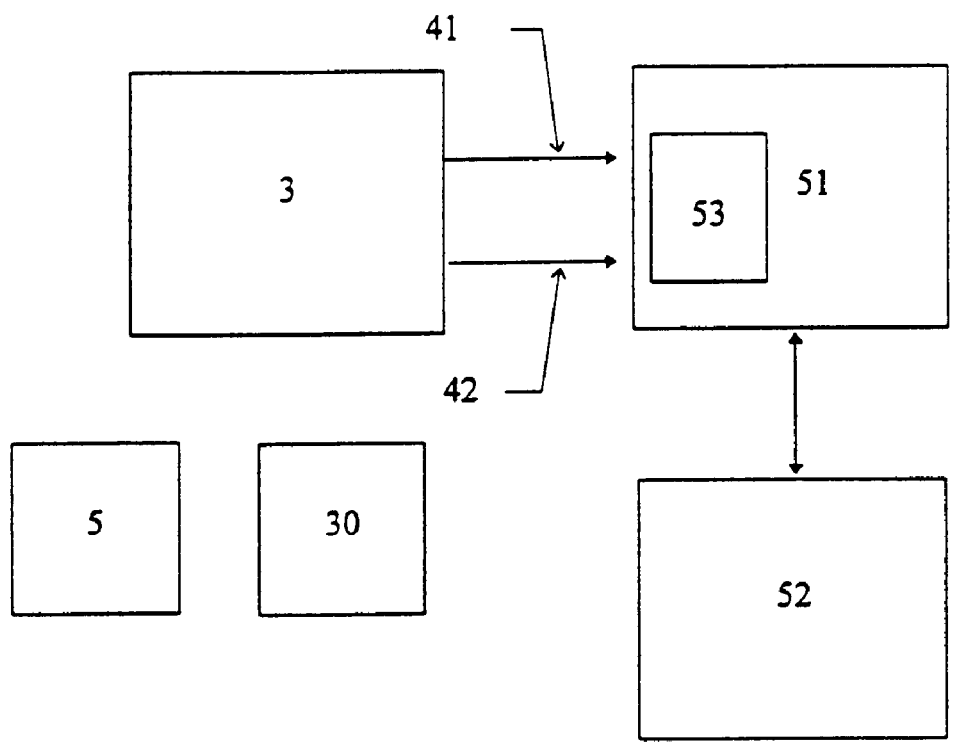
FIG. 1 illustrates a block diagram of an embodiment of the present invention.

An image acquisition system is provided having an objective lens 20 and a beam splitter 19 to split the incoming light into two image paths 1 and 2. On each of the two paths 1 and 2, a wavelength filter 11 and an optional general filter 12 are provided. An image sensor 13, such as a Charge Coupled Device (CCD), is attached to the image path 1 to produce a video signal of the acquired image. Similarly, on the other image path 2, a wavelength filter 15 and an optional general filter 16 before the light reaches the image sensor 17 are provided. The objective lens 20, the beam splitter 19, the plurality of image paths 1 and 2 and its associated optical components are collectively called a viewing module 3. As illustrated in FIG. 1, the multiple lighting methods are collectively indicated at 5.

The two image sensors 13 and 17 generate video signals 41 and 42 which are communicated to a frame grabber 51. The frame grabber 51 is capable of simultaneously acquiring at least two channels of video signals. The video signals 41 and 42 are further digitized such that digital image processing can be carried out by a processor 52. The frame grabber 51 can also be set in a configuration that acquires the multiple images sequentially through the use of an analog video multiplexer 53.

Figure 4:
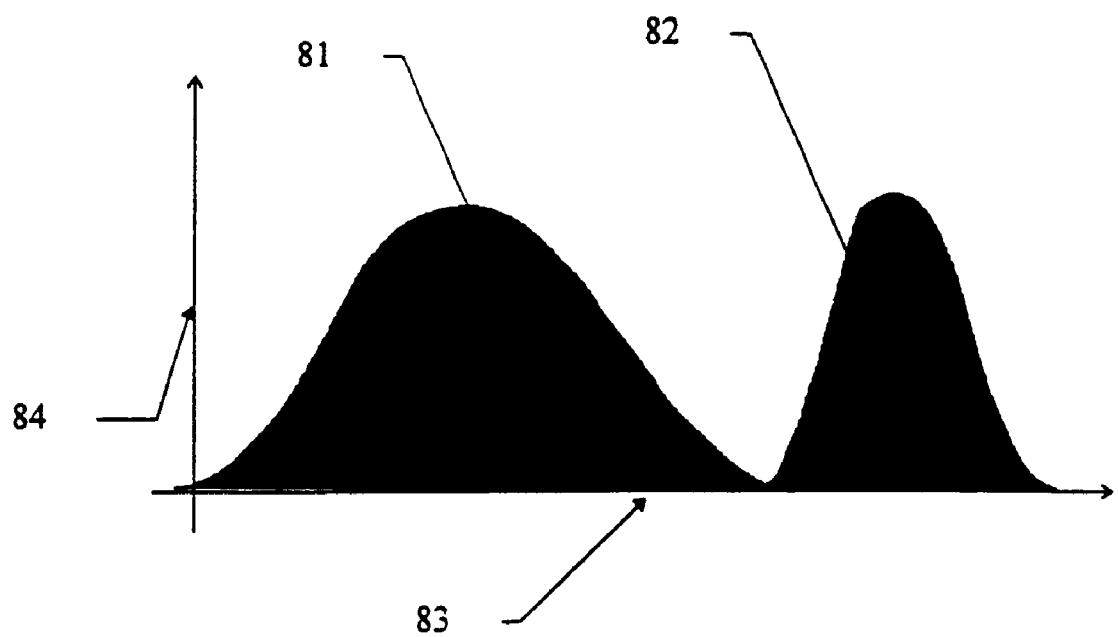
FIG. 4 illustrates spectral response characteristics of the visible light and the near infrared light.
Figure 5A:
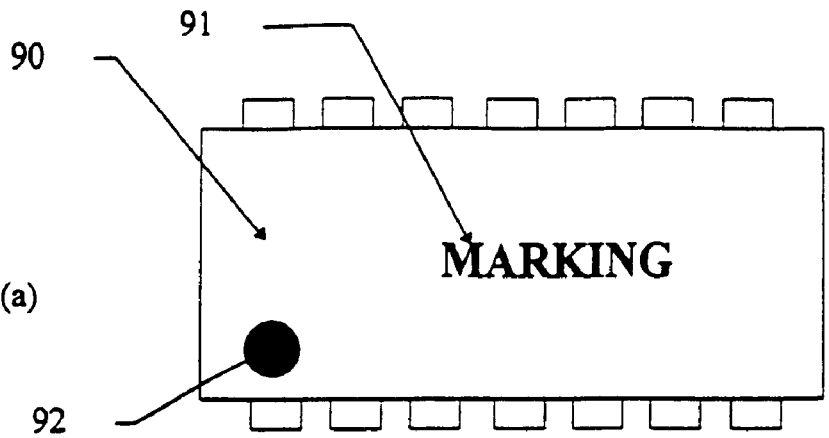
FIGS. 5(a), 5(b) and 5(c) illustrate use of uniform top light and low obliqued light to illuminate marking and shallow dimple on an IC, respectively.
Figure 5B:
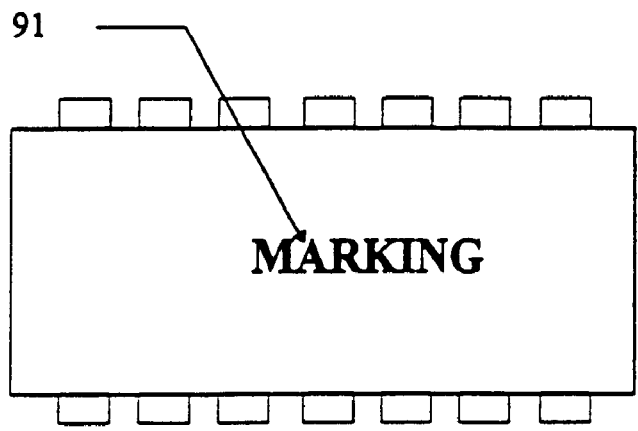
Figure 5C:
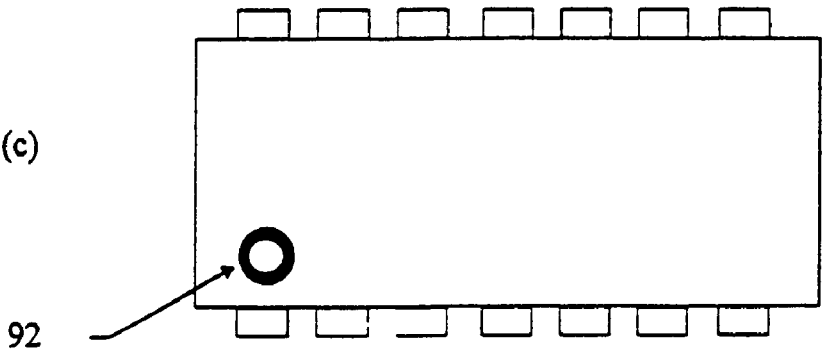

The wavelength filters 11 and 15 situated in paths 1 and 2 are of different characteristics. The difference in their characteristics will be illustrated by means of examples. The wavelength of the visible light spans from 400 nm to 700 nm indicated as 81 in FIG. 4. In other words, 400 nm is perceived as blue while 700 nm is red. The spectral response characteristics of most commonly available sensors is from 400 nm to 900 nm. The most sensitive spectral range is in a range around 550–650 nm. The image sensors 13 and 17 have a better spectral sensitivity in the near infrared range than the human eye. The near infrared band is in a range from 700 nm to 900 nm indicated as 82 in FIG. 4.

Figure 3:
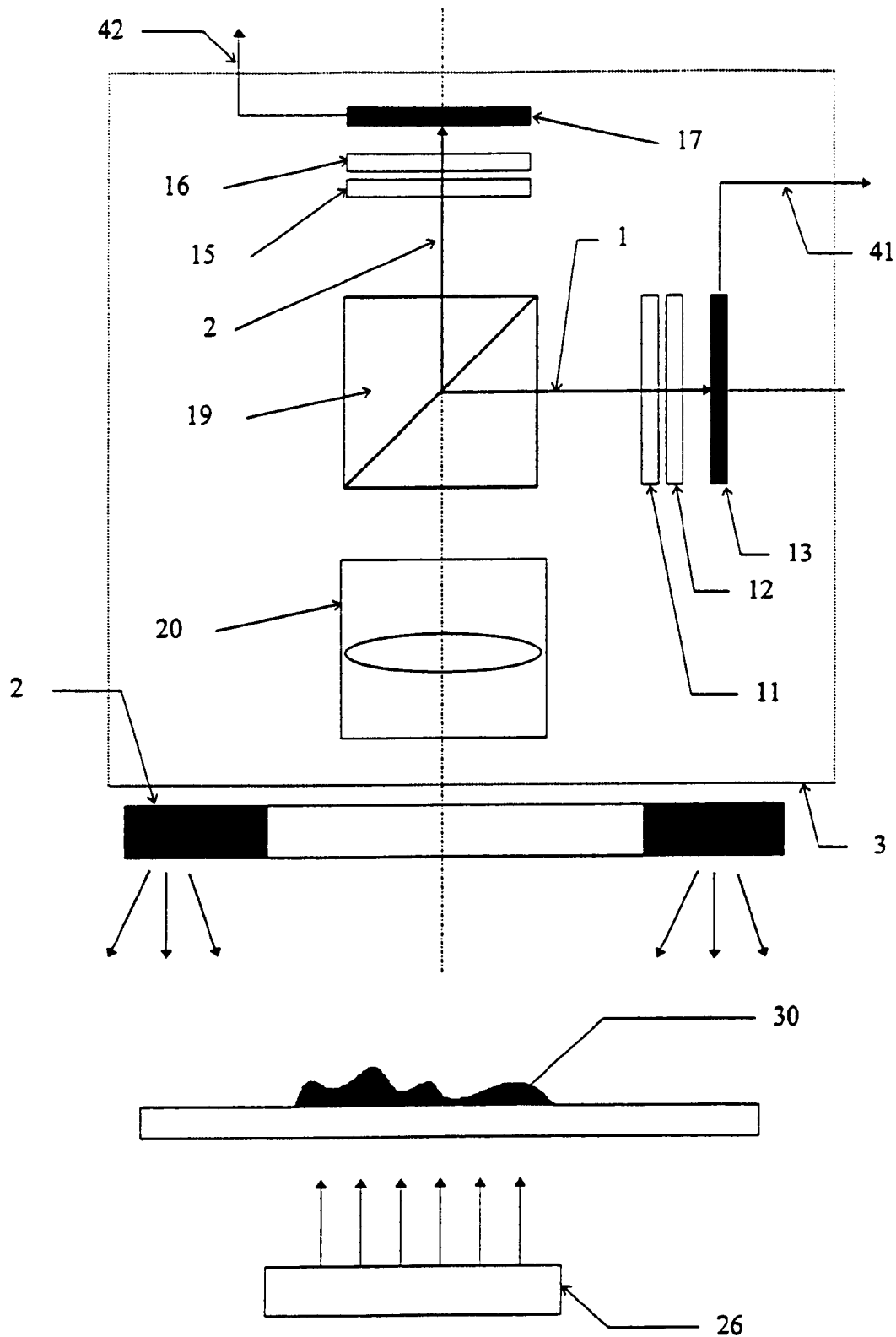
FIG. 3 illustrates an illustration of the viewing and lighting techniques with both back light and front light.

FIG. 3 illustrates an example wherein back lighting 26 and uniform front lighting 25 are simultaneously applied to the scene containing the object 30 of interest. The light source that produces the back light 26 is a near infrared source. Typically, a near infrared light emitting diode is readily available for this type of application. On the other hand, the light source for producing the front light 25 is of visible light without an infrared component. For those skilled in the art, a dichroic filter can be attached to a normal white source such as a tungsten halogen lamp to filter out the infrared component. The combination of these two lighting methods is able to highlight the contour of the object 30 as well as illuminate the surface features of the object 30. The wavelength filter 11 situated in the image path 1 has a characteristic that allows near infrared light to pass through while visible light is blocked. Hence, the back light 26 reaches the image sensor 13 situated on the image path 1 but not the visible front light. The video signal 41 generated by the image sensor 13 is, therefore, a back lighted image of the object 30 revealing its contour or silhouette. The wavelength filter 15 on the image path 2 is a short-pass filter which attenuates near infrared light but passes visible light. Hence, the reflection from the surface of the object 30 of the visible front light 25 is imaged onto the image sensor 17 of the image path 2. The video signal 42 generated by the image sensor 17 is hence a front lighted image of the object 30 without the effect of the back light 26. The optional filters 12 and 16 in both image paths 1 and 2 are intended for various purposes such as to attenuate the light intensity. One such filter is known as the neutral density filter. The optional filters 12 and 16 are required because the objective lens 20 is common to both of the image paths 1 and 2. The aperture of the objective lens 20 is common and cannot be used to control the intensity on the two different image paths 1 and 2.

Figure 2:
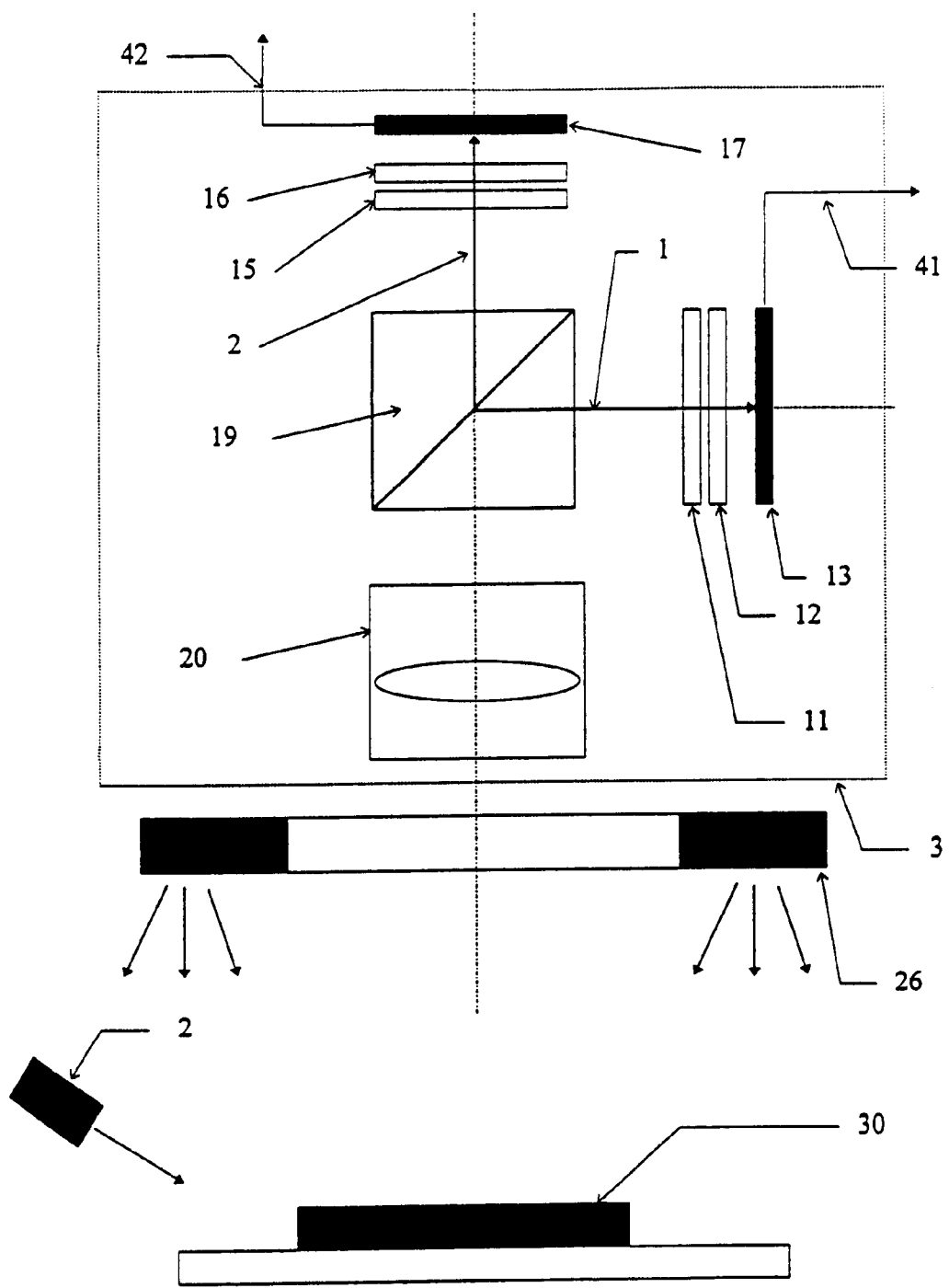
FIG. 2 illustrates an illustration of the viewing and lighting techniques with two different types of front light.

FIG. 2 illustrates another example in which two front lighting methods are simultaneously used. In some applications, a low obliqued front light 25 and a uniform top light 26 may be required simultaneously. If the two front lights 25 and 26 are applied together, the low obliqued front light 25 distorts the uniformity of the uniform top light 26. Using the present invention, the uniform top light 26 is wavelength limited to visible light wavelength (400 nm to 700 nm) without a near infrared component (700 nm to 900 nm). The low oblique light 25 is wavelength limited to near infrared without a visible light component. The image path 1 is used to view the object 30 illuminated image. The application of this example disclosed by the present invention allows both a shallow dimple 92 and a marking 91 on an integrated circuit (IC) 90 to be inspected concurrently. The low obliqued light 25 will highlight the shallow dimple 92 to produce a highly contrasted region while the uniform top light 26 illuminates the marking 91 on a surface of the IC 90 evenly. The processor 52 then applies mark inspection algorithms to the uniformly illuminated image and contrast algorithms to detect the location of the shallow dimple 92. For those skilled in the art, machine vision, mark inspection and contrast algorithms are readily understood. Examples of marking inspection algorithms are differential operations and intensity variance detection.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An image inspection system for inspecting an object, comprising:

a back light source positioned generally behind the object for transmitting light past the object in a predetermined direction in order to project a silhouette image of the object, the back light source being limited to a first wavelength band, a front light source positioned generally in front of the object for reflecting light off the object in the predetermined direction in order to project a reflective image of the object, the front light source being limited to a second wavelength band having minimal overlap with the first wavelength band, separating means positioned generally in front of the object to receive the transmitted and reflected light in said predetermined direction from the object, and to separate the transmitted and reflected light into light traveling along a first path and light traveling along a second path, a first image sensor positioned in the first path to acquire a first image of the object from the light traveling along the first path, a second image sensor positioned in the second path to acquire a second image of the object from the light traveling along the second path, and filtering means to attenuate in the first path light from the second wavelength band, and to attenuate in the second path light from the first wavelength band, such that the first image acquired by the first sensor is substantially a back-lit silhouette image, and the second image acquired by the second sensor is substantially a front-lit reflective image in the second wavelength band.

2. An image inspection system according to claim 1, wherein the filtering means comprises a wavelength filter located in each of the first and second paths.

3. An image inspection system according to claim 1, wherein the separating means comprises a beam splitter.

4. An image inspection system according to claim 1, further comprising means for regulating the intensity of the light in each of the first and second paths.

5. An image inspection system according to claim 4, wherein the regulating means comprises neutral density filters located in each of the first and second paths.

6. A method of inspecting an object comprising:

transmitting light past the object in a predetermined direction using a back light source positioned generally behind the object in order to project a silhouette image of the object, the back light source emitting light in a first wavelength band, reflecting light off the object in the predetermined direction using a front light source positioned generally in front of the object in order to project a reflective image of the object, the front light source emitting light in a second wavelength band having minimal overlap with the first wavelength band, separating the transmitted and reflected light into light traveling along a first path and light traveling along a second path, attenuating in the first path light from the second wavelength band, attenuating in the second path light from the first wavelength band, acquiring a back-lit silhouette image of the object from the light travelling along the first path, and acquiring a front-lit reflective image of the object in the second wavelength band from the light traveling along the second path.

7. A method according to claim 6, wherein the steps of attenuating the light in the first and second paths comprises filtering the light using a wavelength filter in each of the first and second paths.

8. A method according to claim 6, wherein the steps of acquiring the images comprises receiving the images using an image sensor in each of the first and second paths.

* * * * *